ANDREJ VAJDA
VLADIMIR SVOBODA
JOSEF SKOPALIK
JAROSLAV VALNICEK
INVENTORS

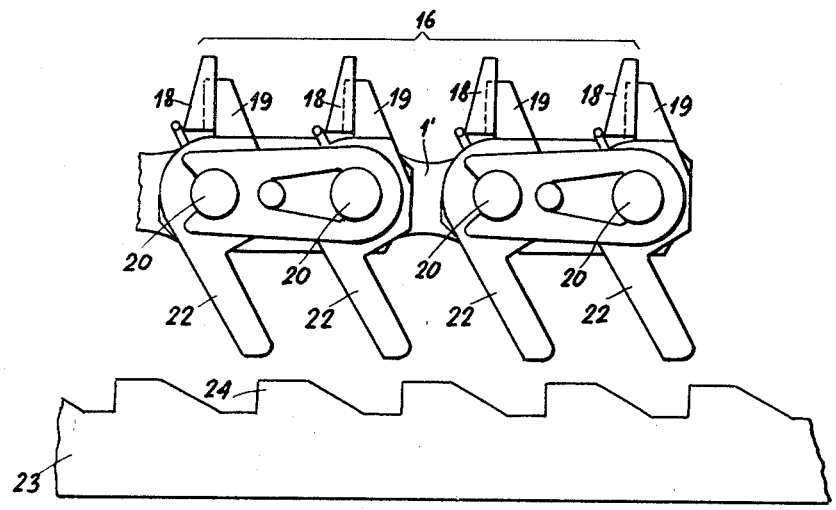
Fig.4
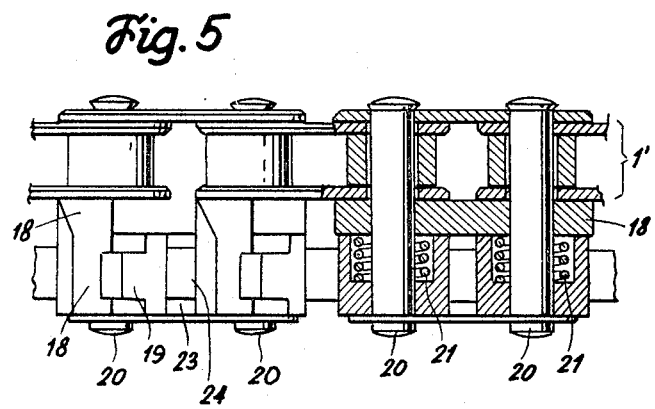
Fig.5
Fig.6
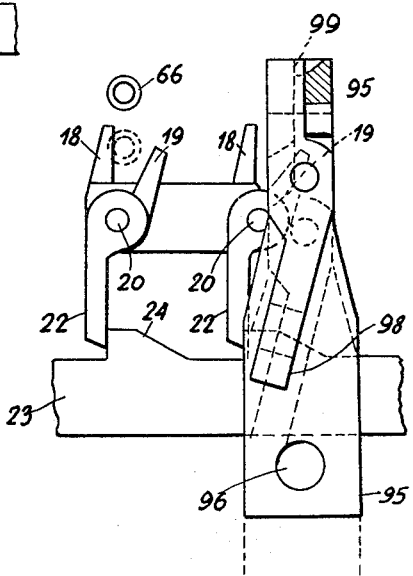
Fig.7
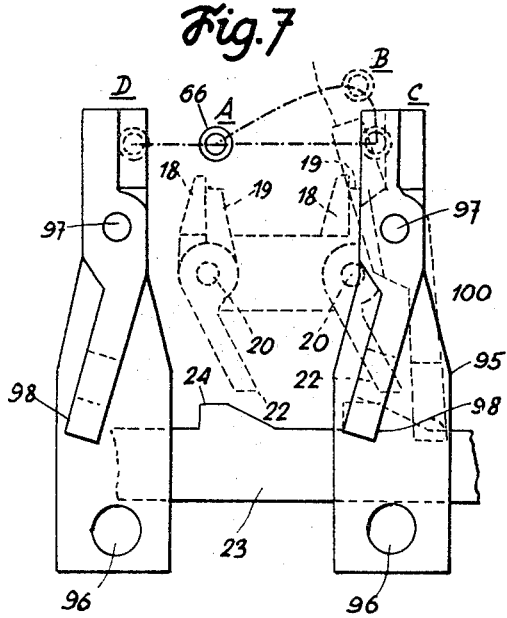
ANDREJ VAJDA
VLADIMIR SVOBODA
JOSEF SKOPALIK
JAROSLAV VALNICEK
INVENTORS
BY Michael S. Striker
ATTORNEY

BY Michael S. Striker
ATTORNEY

Aug. 11, 1970   A. VAJDA ET AL   3,523,432
APPARATUS FOR FORMING A SYSTEM OF WEFT THREADS
Filed July 31, 1968   8 Sheets-Sheet 5

ANDREJ VAJDA
VLADIMIR SVOBODA
JOSEF SKOPALIK
JAROSLAV VALNICEK
INVENTORS

BY *Michael S. Striker*
ATTORNEY

Aug. 11, 1970   A. VAJDA ET AL   3,523,432
APPARATUS FOR FORMING A SYSTEM OF WEFT THREADS
Filed July 31, 1968   8 Sheets-Sheet 6

ANDREJ VAJDA
VLADIMIR SVOBODA
JOSEF SKOPALIK
JAROSLAV VALNICEK
INVENTOR

BY Michael S. Striker
ATTORNEY

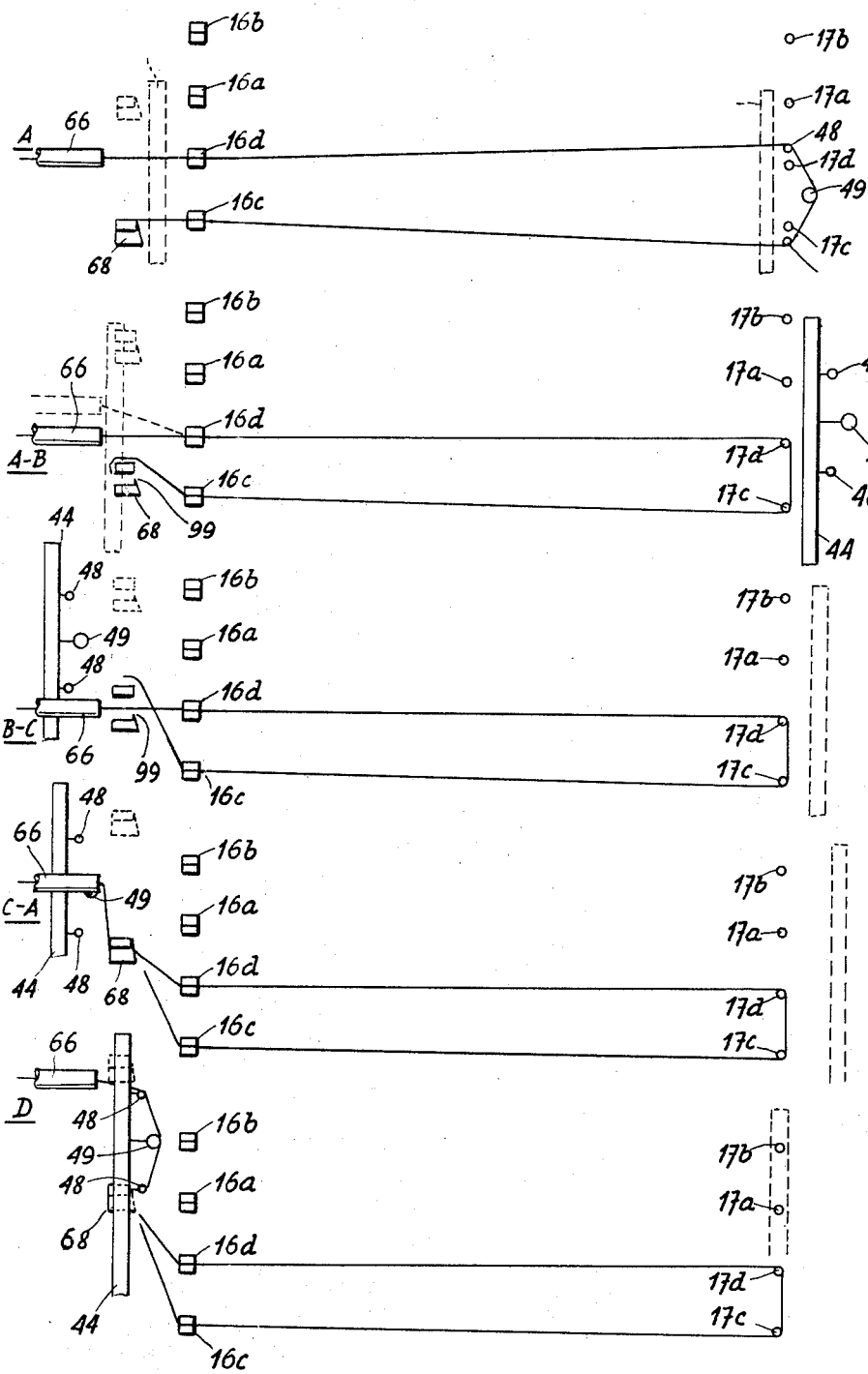

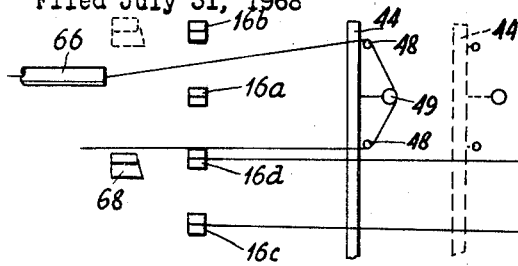
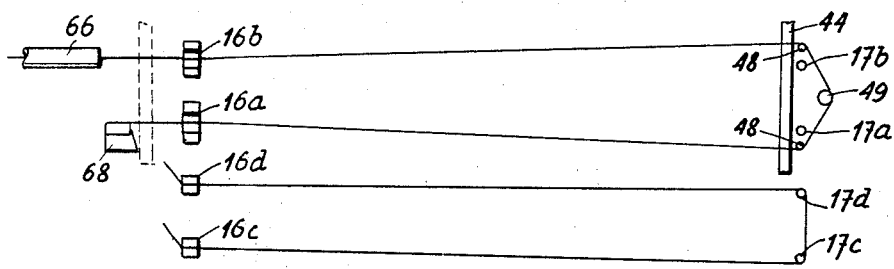
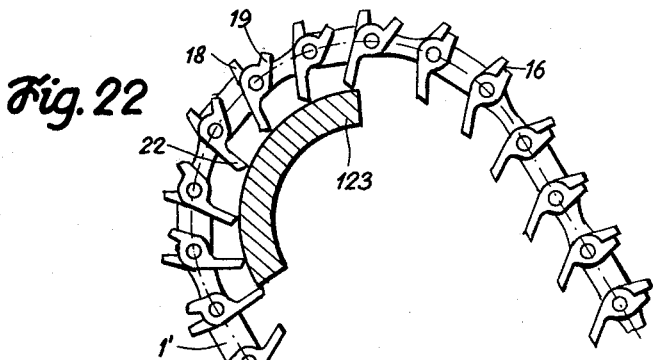
Fig. 22
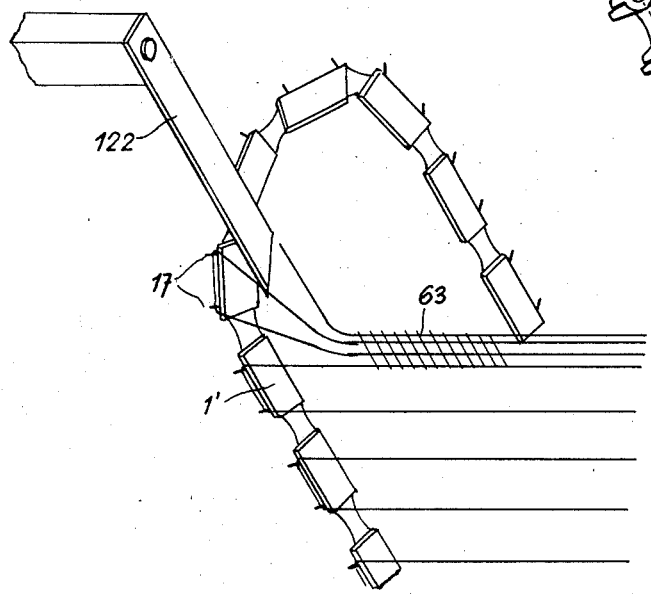
Fig. 23
ANDREJ VAJDA
VLADIMIR SVOBODA
JOSEF SLOPALIK
JAROSLAV VAGNICEK
INVENTORS
BY Michael S. Striker
ATTORNEY 3,523,432
APPARATUS FOR FORMING A SYSTEM OF WEFT THREADS
Andrej Vajda, Vladimír Svoboda, and Josef Skopalik, Brno, and Jaroslav Valníček, Pozorice, Czechoslovakia, assignors to Elitex Zavody Textilniho Strojirenstvi, Generalni Reditelstvi, Liberec, Czechoslovakia
Filed July 31, 1968, Ser. No. 749,104
Claims priority, application Czechoslovakia, Aug. 2, 1967, 5,577/67
Int. Cl. D04b 23/12
U.S. Cl. 66—125                        10 Claims

ABSTRACT OF THE DISCLOSURE

A main conveyor carries loops of weft threads to a warp knitting machine. Each loop extends across the main conveyor and is held by a pair of main grippers on one side and by holding fingers on the other side of the main conveyor. A transverse conveyor carries pulling fingers by which the loops of weft threads are formed and pulled across the main conveyor. Guide tubes are operated to insert weft threads first into auxiliary grippers from where the weft threads are transferred after loop formation to the main grippers.

BACKGROUND OF THE INVENTION

The present invention relates to apparatus for forming a movable system of weft threads which are supplied to a textile machine, such as a stitch knitting machine, a Raschel knitting machine, or a warp knitting machine.

Knitted fabrics, particularly of the type produced in stitch knitting and warp knitting machines, have a very low transverse strength. It has been proposed to produce knitted fabric with transversely inserted weft threads. However, apparatus of the prior art serving this purpose is only intended for use with low speed knitting machines, while in order to arrive at an economic production, higher working speeds must be obtained, and the insertion of at least 400 weft threads per minute must be accomplished.

In a known apparatus for inserting weft threads into a fabric, helical elements are used for producing approximately parallel rows of weft threads, and loops of the weft threads are gripped on both sides of the machine. This arrangement has the disadvantage that the weft threads are subjected to a very high tension so that frequently breakage of the weft threads occurs.

In another apparatus of the prior art, the weft thread system is fed into an inserting carriage moving along a linear path and suspending the individual weft threads of the system on hooks arranged on both sides of a continuously moving conveyor, whose movement is perpendicular to the direction of movement of the inserting carriage. The result of the required combined motion is that the weft thread system is inserted in a slanted position, and that the inserted thread systems are crossed at the dead centers of the reversing carriages. When the slanted and crossed thread systems are produced at the desirable speed, the strength of the fabric in weft direction is insufficient, and the appearance of the fabric is not pleasing due to the irregular crossing of the threads and the resulting irregularities of the fabric.

SUMMARY OF THE INVENTION

It is one object of the invention to provide apparatus for forming a system of weft threads and for transporting the system of weft threads to a knitting machine, such as a stitch knitting or warp knitting machine.

Another object of the invention is to insert a system of weft threads between individual courses of a stitch knitted fabric at a very high speed, while each weft thread is accurately placed in a course of the knitted material at a predetermined density and in a direction accurately perpendicular to the direction of the wales of the knitted fabric.

Another object of the invention is to provide an apparatus capable of forming systems of weft threads of various textile yarns, including synthetic materials, metals, and glass filaments.

Another object of the invention is to provide apparatus for unwinding a plurality of weft threads simultaneously from a creel, and to feed the weft threads simultaneously to a knitting machine so that a fabric patterned in warp and weft direction is obtained.

Another object of the invention is to provide apparatus for producing on a stitch knitting or warp knitting machine, a fabric which can be used for garments, furniture, and industrial purposes.

It is particularly an object of the invention to provide apparatus for the production of knitted fabrics, stitch knitted fabrics, and warp knitted fabrics reinforced by transversely inserted weft threads, which are particularly suited for being knitted to a fleece or fiber mat.

Another object of the invention is to provide apparatus for making a reinforced or patterned net-like fabric for bonded textile fabrics.

Another object of the invention is to provide apparatus for making a reinforced knitted fabric suitable as a base fabric for carpets and other pile fabrics.

With these objects in view the present invention provides a continuously moving conveyor provided on one side with a system of holding fingers and on the other side with a system of grippers. The insertion of weft threads into the grippers and the placement of the same on the holding fingers is effected in a direction transverse to the direction of movement of the conveyor by at least two supports which are movable transverse to the direction of movement of the conveyor which carry pulling fingers for forming transverse loops of the weft threads. The pulling fingers cooperate with a system of auxiliary grippers and a system of guiding tubes which serve for feeding the weft from the bobbins of the creel. The conveyor transports thus formed loops of the weft thread from the supply station to the working station where the yoke portion of the loop is cut off, and a pair of weft threads supplied to the knitting machine.

One embodiment of the invention comprises conveyor means movable in one direction through a supply station and a working station; a row of gripper means mounted on one side of the conveyor means, and a row of holding means mounted on the other side of the same; supply means located at the supply station on said one side for supplying weft threads; loop forming means, preferably including an auxiliary conveyor and pulling means on an auxiliary conveyor which is movable transverse to the direction of movement of the conveyor means from said one side to the other side of the same for forming of the supplied weft threads loops extending across the conveyor means and being open on one side and closed by a yoke portion on the other side; weft inserting means at the supply station for inserting the ends of the open loops into the gripper means; and knock off means located at the supply station at the other side, and including knock off fingers for transferring the yoke portions of the loops from the pulling fingers to the holding means, each of which preferably includes a pair of holding fingers. The ends of the open loops are temporarily held by auxiliary grippers, and are cut off at the supply station, while the yoke portion of each loop is cut off at the working station so that pairs of weft threads are supplied to the knitting machine at the working station.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompany- drawings.

BRIEF DESCRIPTION OF THE DRAWINGS

FIG. 4 is an elevation illustrating gripper means, and means for opening the same;

FIG. 5 is a plan view, partially in section illustrating the gripper means of FIG. 4;

FIG. 6 is a schematic front elevation illustrating the gripper means in an open position for insertion of a weft thread, and also showing auxiliary gripper means;

FIG. 7 is a front elevation illustrating the gripper means and the auxiliary grippers in another operational position;

FIGS. 15 to 21 are schematic and diagrammatic views illustrating successive operational positions of the apparatus;

FIG. 22 is a fragmentary perspective view illustrating the opening of the gripper means at the working station for release of the ends of the weft thread loop; and FIG. 23 is a fragmentary perspective view illustrating the cutting off of the yoke portions of the loops at the working station.

DESCRIPTION OF THE PREFERRED EMBODIMENT

Figure 1:
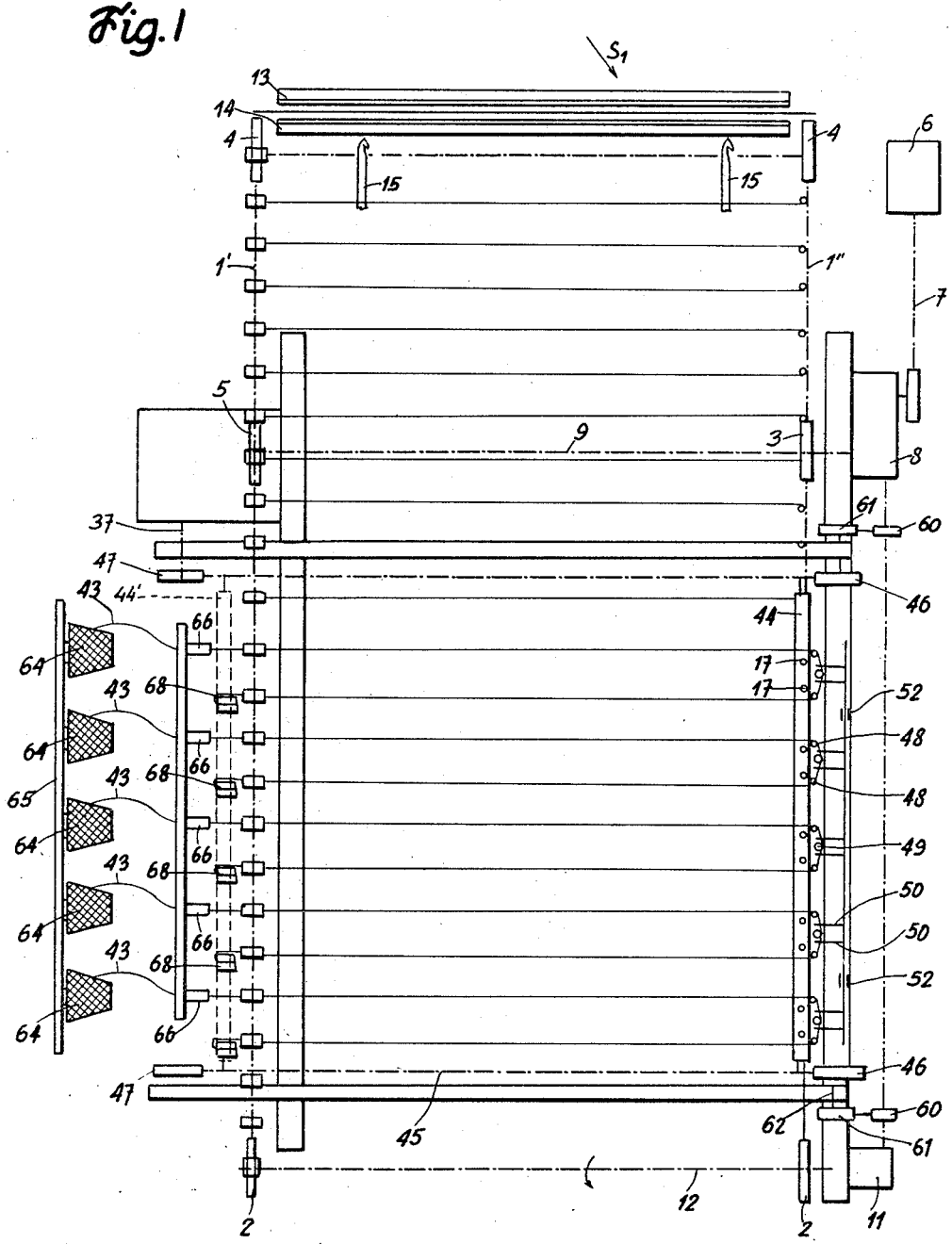
FIG. 1 is a schematic plan view illustrating an apparatus of the invention.
Figure 2:
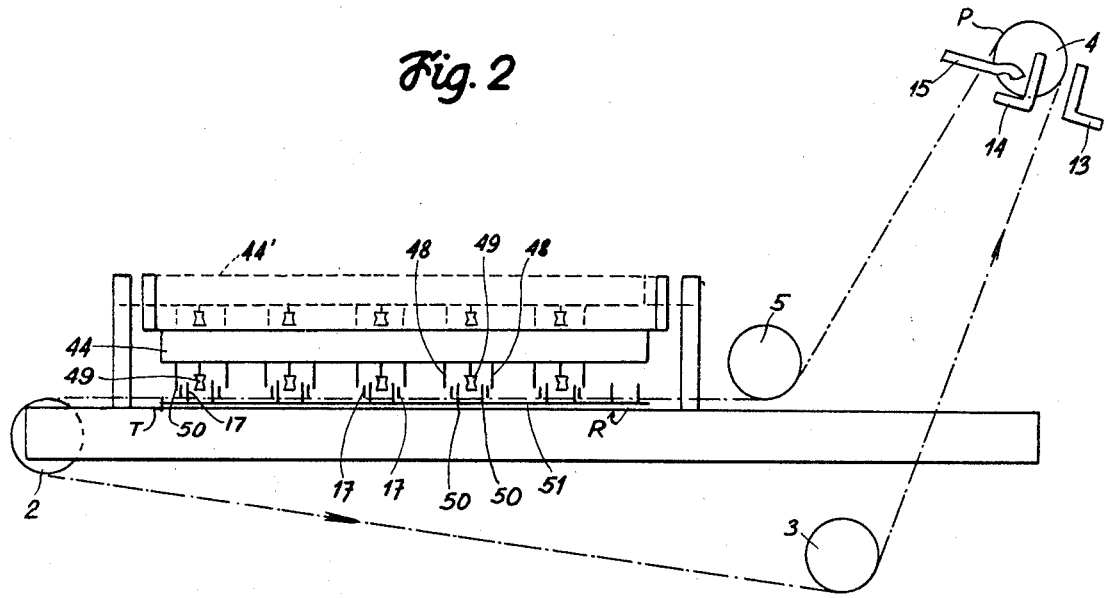
FIG. 2 is a schematic side elevation of the apparatus shown in FIG. 1.

Referring now to the drawing, the apparatus is mounted on a stitch knitting or warp knitting machine. An endless conveyor 1, formed by two endless chains 1', 1", guided by two sets of chain wheels 2, 3, 4, 5 is driven by drive wheels 2 and 5, and is guided or tensioned by the other wheels. A motor 6 is connected by a chain 7 to the chain wheel of a gear transmission in a gear box 8, the gear box having output shaft 9, schematically indicated in FIG. 1 for driving wheels 5. A shaft 10, schematically shown in FIG. 1, connects the gear box 8, a gear transmission in gear box 11 whose output shaft 12 drives chain wheels 2, as shown in FIGS. 1 and 2.

The endless chains 1', 1" of the conveyor, and more particularly chain portions located between wheels 3 and 4, pass through a gap between a first comb structure 13 and a second comb structure 14 which are part of a stitch knitting machine including a row of needles 15 which are reciprocable to pass between the spaces between the teeth of the combs 13 and 14, comb 14 serving to knock off the loops.

Figure 3:
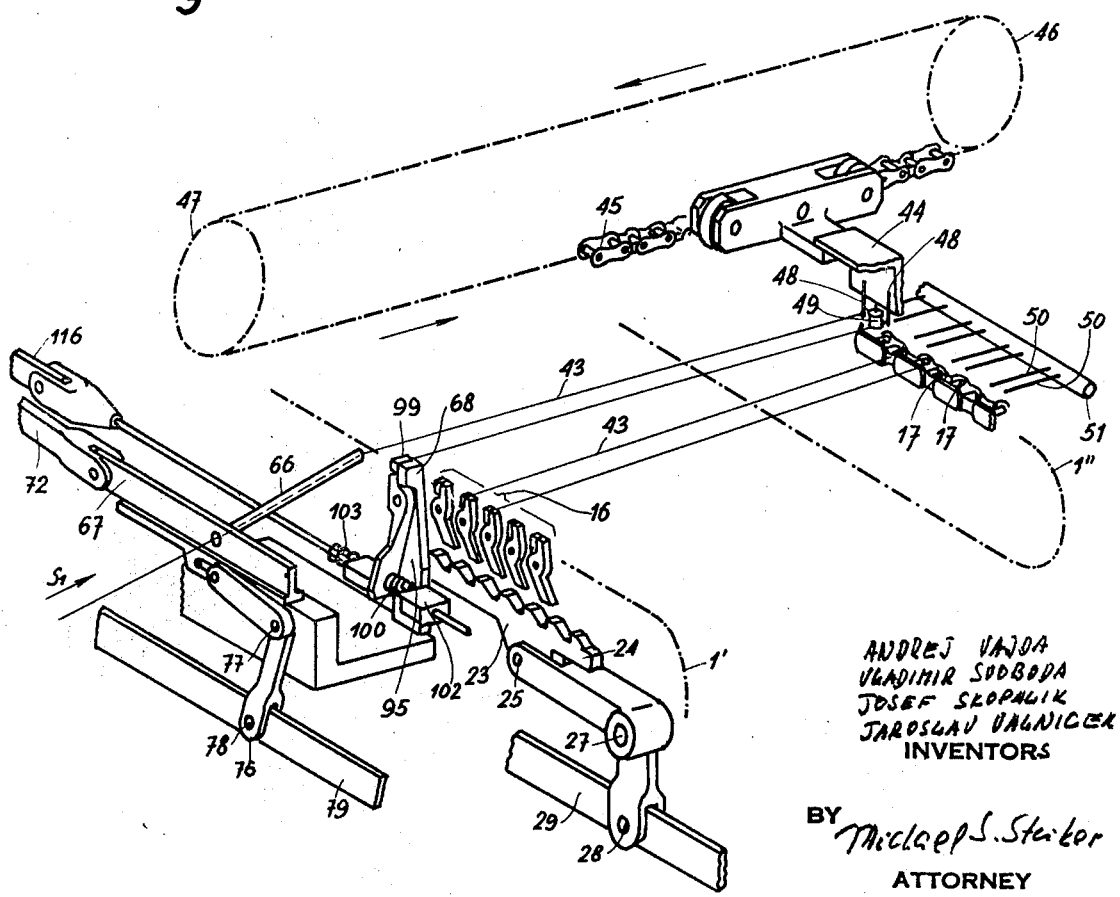
FIG. 3 is a fragmentary perspective view illustrating a part of the apparatus, other parts being omitted in FIG. 3 for the sake of clarity.
Figure 9:
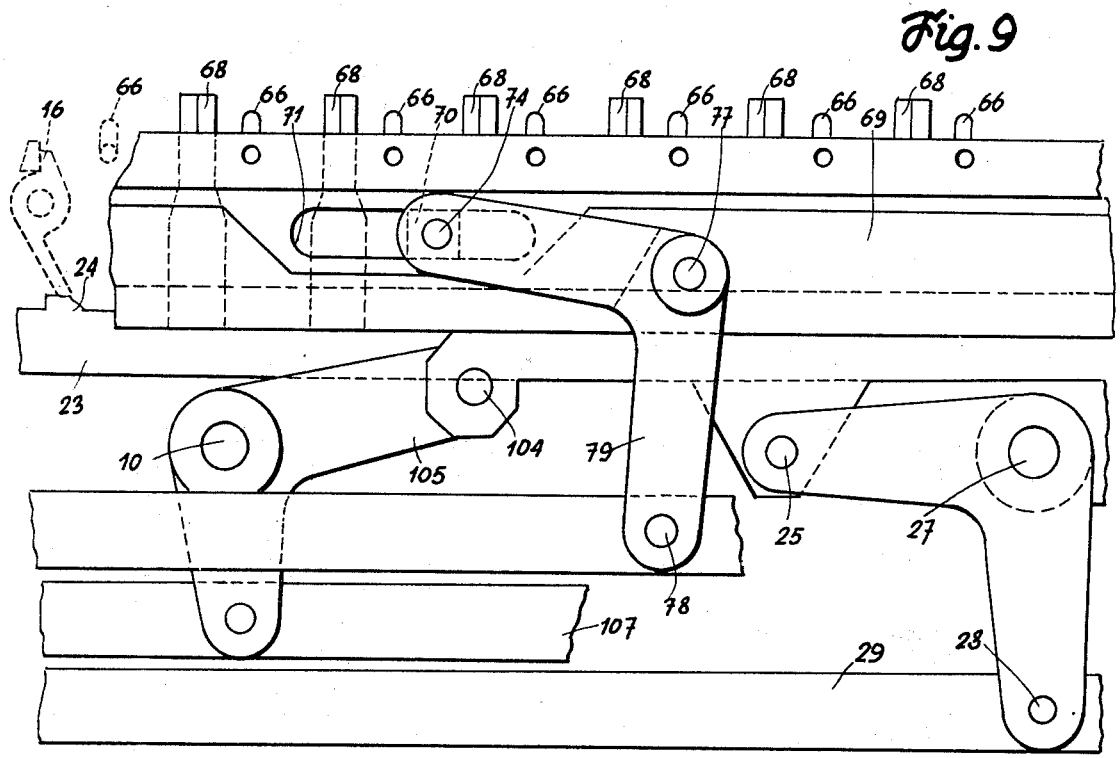
FIG. 9 is an elevation illustrating a part of the mechanism shown in FIG. 5.

Chain 1' carries a row of grippers 16, as best seen in FIGS. 3, 4 and 5, including stationary jaws 18 of which pairs form a part of a link of chain 1', and movable jaws 19 which are freely rotatable on pins 20 carried by chain 1'. The movable jaws 19 are biassed by springs 21 to move toward the stationary jaws 18. In order to obtain a firm gripping of the weft threads, stationary jaws 18 have a U-shaped cross section, and the movable jaws 19 enter into the space between the arms of the stationary jaws 18, as best seen in FIGS. 4 and 5. Buffers are provided at the lower ends of stationary jaws 19, and cooperate with a vertically movable stop motion comb 23 provided with a row of teeth 24.

Figure 10:
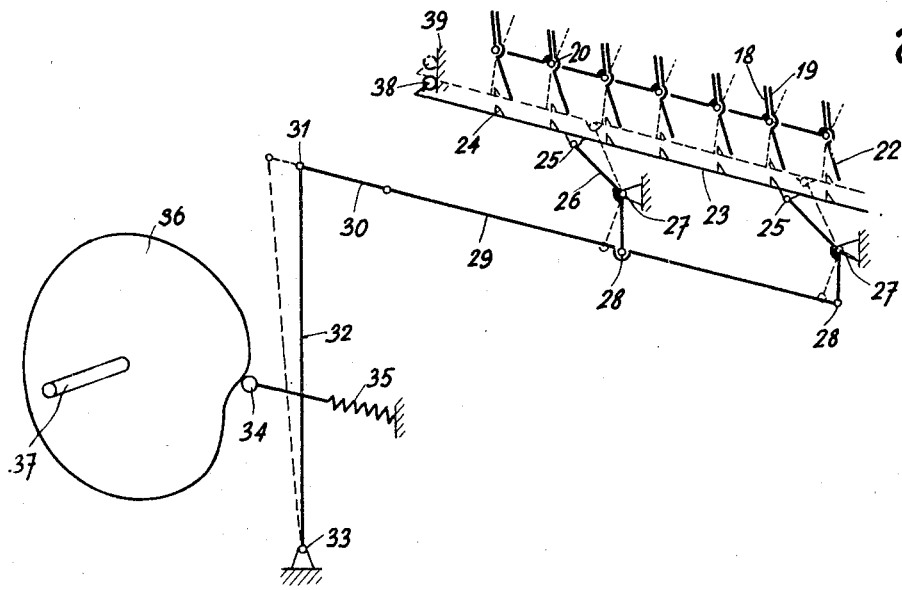
FIG. 10 is a schematic perspective view illustrating the operation of the gripper means.

Stop motion comb 23 is mounted on pivots 25 of angular levers 26 which are supported on stationary pivots 27 provided on the machine frame, as schematically shown in FIG. 10. The ends of levers 26 are connected by pivot joints 28 to a control rod 29, which is connected by a link 30 with a pivot 31 at the end of a lever 32 which is mounted for rocking movement on a stationary pivot 33 supported on the machine frame. Lever 32 carries a transverse arm ending in a cam follower roller 34 cooperating with a cam 36 under the action of a spring 35 which engages the transverse arm of lever 32. Cam 37 is secured to a rotating drive shaft 37 so that cam follower means 32, 34 is rocked together with control rod 29 and levers 26 to displace the stop motion comb 23.

A roller 38 is carried by stop motion comb 23 which is guided along a guide face 39 on the frame of the machine. Guide face 39 effects a positive displacement of the stop motion comb 23 in horizontal direction so that grippers 16 are opened by pressure of the teeth 24 of stop motion comb 23 acting on the buffer arms 22 of the movable jaws 19 when stop motion comb 23 is in the raised position shown in FIG. 6, and also in broken lines in FIG. 10.

Figure 8:
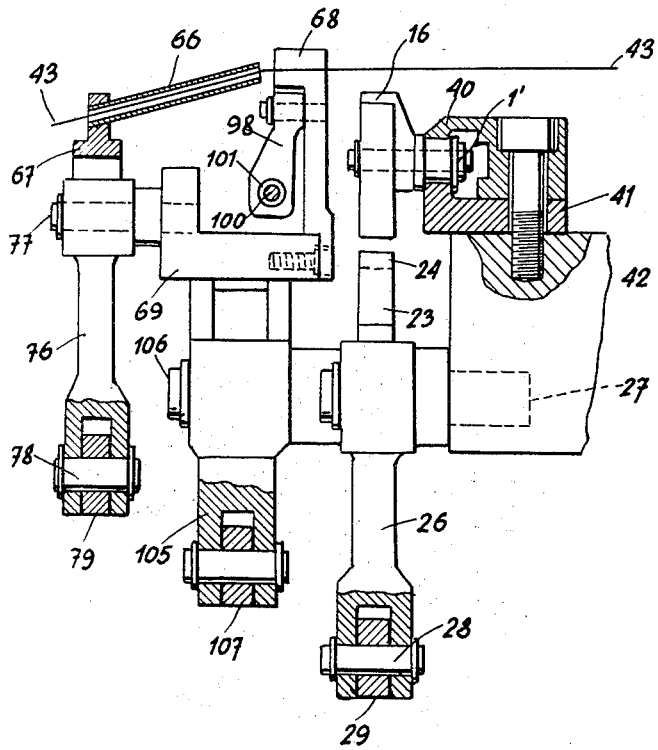
FIG. 8 is a front elevation, partially in section, illustrating the operation of the guiding tubes for insertion of a weftthread into an auxiliary gripper, and also showing the gripper means.

In the region where teeth 24 engage the arms 22 of grippers 16, chain 1' is guided by guide elements 40, 41, see FIG. 8, which are fastened by a screw to the support 42 of the machine.

Stop motion comb 23 is reciprocated under the control of cam 36 between the lower inoperative position shown in FIG. 10 in full lines, and an upper operative position shown in broken lines in FIG. 10 in which position teeth 24 are disposed in the paths of arms 22 of jaws 19 of grippers 16, as is also apparent from FIGS. 6, 7 and 3.

Each link of chain 1" carries a pair of holding members for suspending a loop of a weft thread 43.

At least one pair of pulling supports 44 and 44' is mounted above conveyor 1 for movement in transverse direction along a continuous path. The pair of supports 44 and 44' are mounted on two continuous chains 49 guided over two pairs of chain wheels 46, 47, as shown in FIGS. 1, 2, 3, 13 and 14. A system of pairs of pulling fingers 48 is mounted on the pulling supports 44, 44' in front of which a guiding roller 49 is located in the pulled out position. A plurality of supports 44 may be provided on the endless chains 45.

Figure 13:
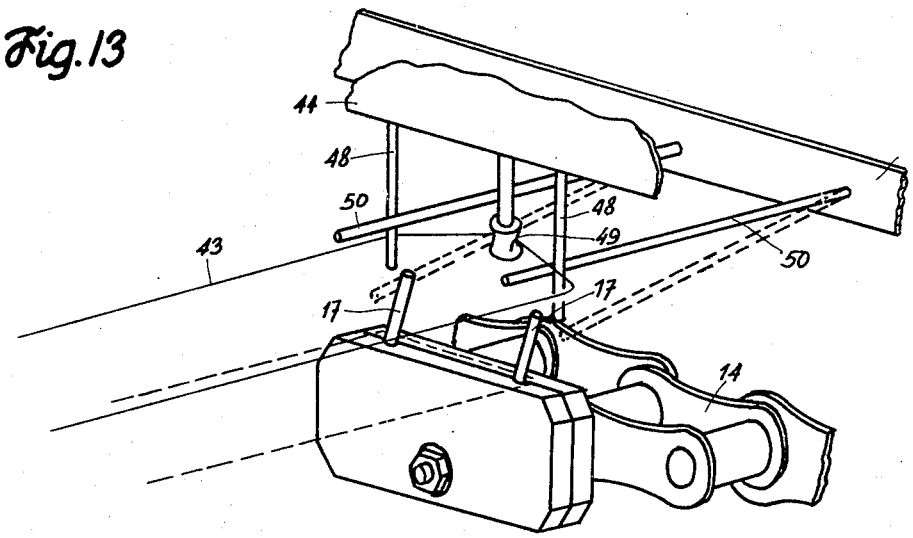
FIG. 13 is a perspective view on an enlarged scale illustrating the transfer of a loop of a weft thread from the loop forming means to holding means on the conveyor means.

Pulling fingers 48 are located at points above the holding members 17, and cooperate with pairs of knock off fingers 50 mounted on a rod 51 and formed with the same, a knock off comb. The pairs of fingers 50 of the comb penetrate between the pairs of pulling fingers 48 and are offset to the holding members 17, as best seen in FIG. 13.

Rod 51 carries a lever arm 53 which is biassed by a spring 54 to engage a stop 55 on the frame of the machine. An adjusting screw spindle 56 is mounted on a double armed lever 57 which is freely turnable on a stationary pin 58 secured to the machine frame. A stud 59 is mounted on the endless chain 45, which carries pulling supports 44, 44', and when stud 59 engages the upper arm of lever 57, the same is angularly displaced in clockwise direction about pivot 58 and effects a rocking motion of lever arm 53 against the pull of the spring 54 through the screw spindle 56. In this manner, rod 51 is turned in bearings 52 so that the fingers 50 of the knock off comb 50, 51 move out of the position shown in solid lines in FIG. 13 to the position shown in broken lines so that a loop of weft thread 43 is pulled down from the pulling fingers 48 and placed on a pair of holding members 17.

Endless chains 45 which carry the pulling supports 44, 44', are driven by chain wheels 46 which are connected for rotation with chain wheels 61 driven from drive shaft 10 by chain wheel drive 60, as shown in FIG. 1.

A row of cross wound bobbins 64 is mounted on a creel 65 on the side of the machine frame. Weft yarns 43 supplied by bobbin 64 are fed to grippers 16 by a row of auxiliary grippers 68 which are mounted on a carrying support 69 and pull the weft yarns over pulling fingers 48 and guide roller 49 through guide tubes 66, see FIGS. 1, 3, 6, 7, 8, 11 and 12.

The row of guiding tubes 66 on support 67 moves together with support 67 about a curved path composed of a substantially horizontal, and a substantially vertical portion as shown in heavy broken lines in FIG. 7. This movement is imparted to the support 67 and tubes 66, on one hand by means of several slide blocks 70 guided in longitudinal grooves 71 of support 67, see FIG. 11, and on the other hand by a link 72 which is articulated to support 67 by pin 73.

All blocks 70 carry pins 74 disposed between the prongs 75 of a forked arm 75 of a double armed angular lever 76 which is mounted for rocking movement on a pivot pin 77, a plurality of pivot pins 77 being provided on the carrying support 69.

Figure 11:
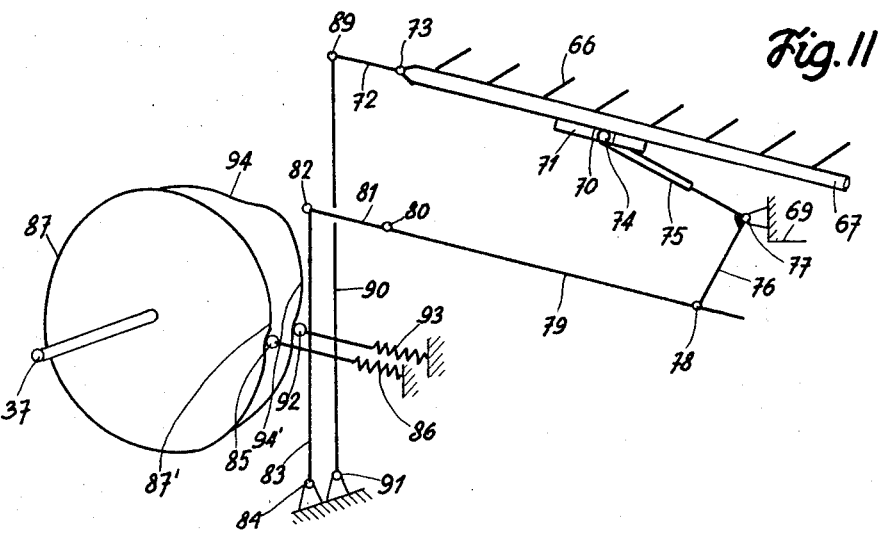
FIG. 11 is a schematic perspective view illustrating the operation of the guiding tubes.

Several systems of blocks 70, grooves 71, pins 74, forked arms 75, double armed levers 76 and pivot means 77 are provided, but for the sake of simplicity and clarity, only one system is shown in FIGS. 3 and 11.

The lower arms of the double armed levers 76 carry pins 78 connected with a control rod 79 which is pivotally connected at 80 with a link 81 which is articulated at 82 to a lever 83 mounted for rocking movement on a stationary pivot means 84. Lever 83 carries a fixed transverse arm having a cam follower roller 85 at one end and being biassed at the other end by a spring 86 so the cam follower roller 85 cooperates with a cam track of a control cam 87 which is rotated by a shaft 37.

A link 72 is articulated at 73 to the support 67 and at 89 to a lever 90 having a transverse arm which carries a cam follower roller 92 at one end, and is biassed by spring 92 at the other end so that cam follower roller 92 cooperates with the peripheral cam track of another control cam 94 carried by the rotating shaft 37.

The control cams 87 and 94 together control the movement of support 67 which carries the guide tubes 66 for the weft yarns. The tubes are moved about the composite path shown in heavy broken lines in FIG. 7, and beginning at the point A, extending obliquely upwards toward a point B, and then sloping steeply downwardly to a point C from where the tubes are moved in horizontal direction to a point D and from there again to the starting point A, as shown in FIG. 7 which is an elevation as viewed from the left of FIG. 3. The compositive motion serves the insertion of weft yarns 43 into the grippers 16 and auxiliary grippers 68, as will be explained hereinafter.

The auxiliary grippers 68, see FIGS. 1, 3, 7 and 12, are mounted on carrying support 69 to which the stationary jaws 95 are secured by screws guided through a hole 96, see FIGS. 7 and 8. A pin 97 is mounted on the stationary jaw 95 and turnably carries a movable jaw 98. The stationary jaw 95 has a cutting edge 99 in its upper part, see FIGS. 6 and 3, whose function will be explained hereinafter.

All movable jaws 98 have openings 100 in their lower parts through which a rod 101 passes, as shown in FIGS. 3, 7, 8 and 12. Rod 101 carries a block 102 for each movale jaw 98 and being biassed by a corresponding spring 103 which is slidable on rod 101. The spring action of blocks 102 on the lower ends of movable jaws 98 of auxiliary grippers 68, tends to press the movable jaws 98 against the stationary jaws of the auxiliary grippers 68. An axial movement of rod 101 to the right as viewed in FIG. 3 and FIG. 12 will cause the simultaneous opening of all auxiliary grippers 68 due to the action of the blocks 102 against the lower arms of the movable jaws 98.

The required movements of the auxiliary grippers in upward and downward direction, and simultaneously therewith the movement of holder 67 with guiding tube 66 upwardly and downwardly, is obtained by the movement of carrying support 69, whereas the axial movement of rod 101 effects the opening of the movable jaws 98. As explained above, the pivots 77 on carrying support 69 cooperate with lever 76, control support 67 with guiding tubes 66.

Carrying support 69 is mounted on a pair of angular levers 105 which are supported by stationary pivot means 106 and are articulated by pivot pins 104 to support 69. The other arms of levers 105 are articulated to a control rod 107 connected by a pivot 108 to a link 109 which is connected by a pivot 110 to a lever 111 supported on a stationary pivot 112 and having a transverse arm with a cam follower roller 113, urged by a spring 114 into engagement with the cam track of a control cam 115 driven by drive shaft 37.

Figure 12:
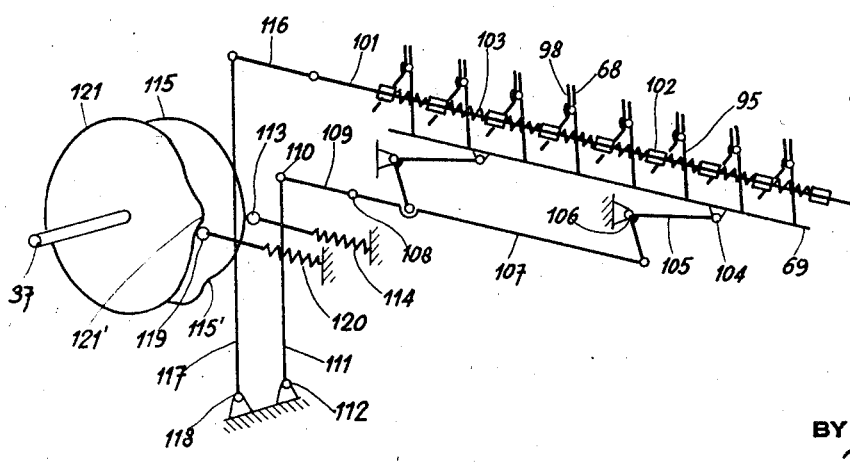
FIG. 12 is a schematic perspective view illustrating the operation of the auxiliary grippers.

As also shown in FIG. 12, rod 101 is connected by an articulated link 116 to a lever 117 rockable about a stationary pivot means 118 and carrying a transverse arm with a cam follower roller 119 biassed by a spring 120 into engagement with the cam track of a control cam 121 driven by shaft 37.

Shaft 37 is a cam shaft carrying cams 87, 94, 115, 121 and 36, and is driven by a chain wheel and chain 45 from chain wheel 46, as shown in FIG. 1.

If the apparatus of the invention is to be used in a high-speed machine, for example, in a machine known under the trade name Arachne which produces about 600 courses per minute, it is necessary to provide a great number of elements of the system of auxiliary grippers 68, guiding tubes 66, pulling fingers 48, and knock off fingers 51, for example a set of more than twenty elements, one guiding tube 66 and one auxiliary gripper 68 being used for one pair of fastening grippers 16. It is evident that a machine operating at a lower speed, the number of elements of the system could be smaller, while an even more efficient machine would require an even greater number of elements of the system.

As shown in FIG. 23, a knife 122 is located between the fabric 63 to be produced and the conveyor chain 1' for cutting off the weft threads 43 at a point between the fabric 63 and the holding members or fingers 17 described with reference to FIG. 13.

Behind the point where the weft threads 43 are knitted into the warp loops, the ends of weft threads 43 are released. The weft threads, which are still held by the fastening grippers 16, are released when the arms 22 of the movable jaws 19 engage the stationary cam against segment 123, as shown in FIG. 22. Weft threads 43 which are knitted into the fabric are thus released, but beyond the stationary segments 123, springs 21 turn the movable jaws 19 of grippers 16 back to the closed position, see also FIGS. 4 and 5.

OPERATION

Conveyor 1, with chain 1' carrying the fastening grippers 16, and with chain 1" carrying the holder fingers 17, performs a continuous motion in the direction of the arrows shown in FIG. 2 during which the weft threads 43 are inserted. The weft threads are held in the form of loops in pairs of fastening grippers 16 and are held by pairs of holding fingers 17 between the knock off comb 14 and the closing comb 13 of the stitch knitting machine in which weft threads 43 are successively inserted into the loops of wales of the stitch knitted or warp knitted fabric which is produced in the well known manner by the needles 15 and other well known, but not illustrated mechanism, for example laying needles. During the knitting in of the weft threads, the fastening grippers 16, located at the operating areas of the loop forming needles 15 are open, as explained above, due to the action of the stationary cam segment 123, see FIG. 22, so that the ends of the previously gripped and inserted weft threads 43 are released. Behind the knitting point between the textile fabric 63 and the holding fingers 17, the loops of weft threads 43 are cut by knife 122, as shown in FIG. 23.

Fastening grippers 16 and holding fingers 17 are during this operation located between the points T and R along the path of the conveyor chains 1′ and 1″, as shown in FIG. 2. In the region of the conveyor between the points P and R, grippers 16 and holding fingers 17 are empty and without weft threads since the same are inserted into the textile fabric. A new system of weft threads has to be fed in the region from R to T by means of fastening grippers 16 and holding fingers 17. The jaws 18, 19 of fastening grippers 16 are closed without gripping a weft thread while being returned by conveyor 1 from the point P to the point R.

In the section of the path of conveyor 1 between points R and T, weft threads 43 are fed into the corresponding system of fastening grippers 16 and holding fingers 17 corresponding to the operative width of the pulling support 44. When one system of weft threads 43 has been fed, the guiding tubes 66 are located at the axis of the corresponding fastening grippers 16, while the auxiliary grippers are located with their edges in the axis of the corresponding fastening grippers 16, as schematically shown in FIG. 19. The edge of the auxiliary grippers 68 is at least partly surrounded by the weft thread.

FIGS. 15 to 21 which schematically illustrate successive operational positions of the apparatus, designate the fastening grippers 16 of a series by reference numerals provided with alphabetical subscripts $a$ to $d$. The two fastening grippers 16 which are first emptied are designated 16$a$ and 16$b$, and the trailing fastening grippers 16 are designated 16$c$ and 16$d$. Corresponding subscripts are used for distinguishing the holding fingers 17 and 17$a$, 17$b$, 17$c$ and 17$d$.

Figure 14:
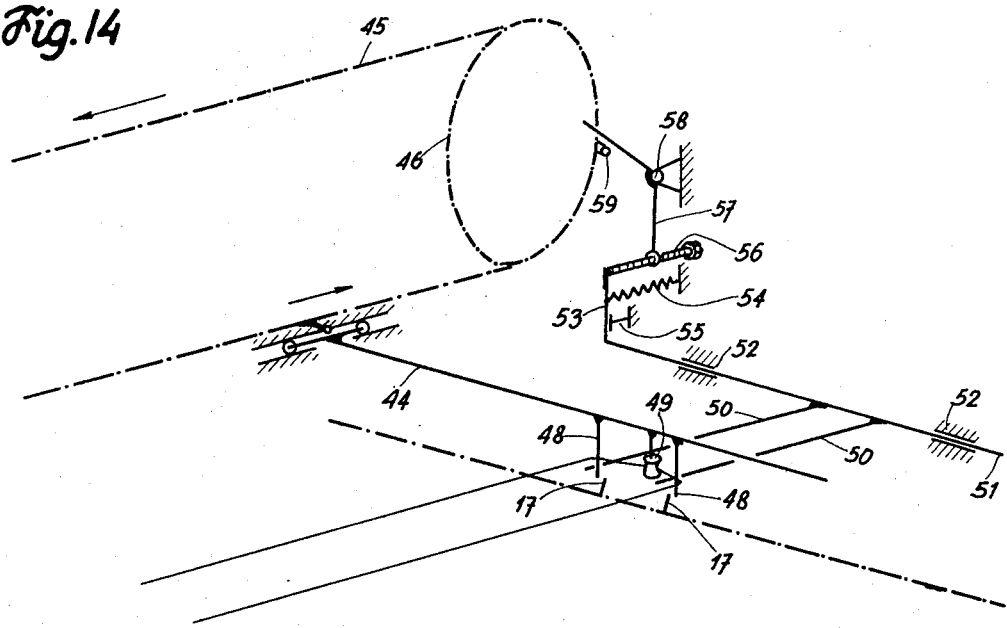
FIG. 14 is a perspective schematic view of the pulling fingers driving mechanism.

FIG. 15 illustrates a basic initial position in which the first pair of closed, but empty grippers 16$a$ and 16$b$, and empty holding fingers 17$a$ and 17$b$ pass the point R shown in FIG. 2. In this basic position, the weft threads 43 are inserted into all preceding grippers including the two trailing grippers 16$c$ and 16$d$ which are closed and grip threads 43 between jaws 18, 19. In this initial basic position, the pulling support 44 with pulling fingers 48 is locked above the holding fingers 17, as shown in FIGS. 14 and 15. In this position, a guiding tube 66 is aligned with gripper 16$d$, and the marginal edge of auxiliary gripper 68, around which the weft thread 43 is guided into the fastening gripper 16$c$, is positioned aligned with fastening gripper 16$c$.

During the following phase of the operation, fastening grippers 16$a$, 16$b$, 16$c$, and 16$d$ move from point R to point T while knock off comb 50, 51 is rotated due to the turning of rod 51 caused by pin 59 on endless chain 45 which turns the linkage 57, 56, 53, as shown in FIG. 14. The angularly displaced knock off fingers 50 pull the loop of weft threads 43, guided along pulling fingers 48 and the guiding pulley 49 onto the holding fingers 17$c$, 17$d$ so that weft yarn 43, withdrawn from the crosswound bobbin 64 and passing through guiding tube 66, is gripped in the jaws of fastening gripper 16$d$, held and suspended on the holding fingers 17$c$ and 17$d$, is gripped in the jaws of fastening gripper 16$c$ ending in the closed jaws of auxiliary gripper 68, as shown in FIG. 15.

In the following phase of the operation, the movable jaw 98 of the auxiliary gripper 68 is opened by lug 121′ of the cam 121 acting through cam follower means 119, 117 on link 116 and rod 101 carrying the blocks 102, as shown in FIG. 12. The displacement of rod 101 to the right as viewed in FIG. 12 causes the opening of the movable jaws 98 of grippers 68 by blocks 102 against the action of springs 103.

When the movable jaws 98 of auxiliary grippers 68 open, the ends of weft threads 43 are pulled out of the auxiliary grippers in the position of FIG. 16 during further movement of conveyor 1. The guiding tubes 66, which are located in the position A shown in FIG. 7, begin to move to the right and upwardly toward point B, as shown in FIGS. 7 and 16, due to the action of lugs 87′, 94′ of cams 87, 94, levers 83 and 90, links 72 and 81, rod 79, two armed levers 76, forked arms 75, pins 74, sliding blocks 70 and longitudinal grooves 71, in cooperation with support 67 which carries guiding tubes 66.

During the following phase of the operation, fastening gripper 16$d$ is aligned with an open auxiliary gripper 68, and guiding tube assumes the position B shown in FIG. 7 in which it is located above the open jaws of auxiliary gripper 68, as shown in FIG. 17. Guiding tube 66 performs a downward movement in the path B–C, shown in FIG. 7, in which a weft thread 43 is placed between the open jaws of auxiliary gripper 68 by the respective guiding tube 66.

During the following phase of the operation, the jaws of auxiliary gripper 68 are closed, and the guiding tube 66 moves from the position C over position A to the position D in which it is stopped. In the operational position shown in FIG. 18, guiding tube 66 is in the position A, and fastening gripper 16$d$ passes the auxiliary gripper 68. At the same time, pulling support 44′ enters the upper run of the endless path of chains 45, while pulling support 44 enters the lower run of chains 45.

The next following phase of the operation is shown in FIG. 19 where the guiding tube 66 has moved to the end of the horizontal movement to the position D, while weft thread 43 gripped in fastening gripper 16$d$ has been cut by the cutting edge 99 of auxiliary gripper 68, see FIG. 6, due to the further traversing motion of gripper 16$d$. The new weft thread 43 remains now held in the closed jaws of auxiliary gripper 68 and passes through the guiding tube 66 to the crosswound supply bobbin 64. In the meantime, however, pulling support 44 has reached a position in which pulling fingers 48 and the guiding roller 49 are located between the auxiliary grippers 68 and the guiding tube 66. Guide roller 49 and pulling fingers 48 begin now to pull out weft thread 43 from the guiding tube 66 and the respective crosswound bobbin 64 during movement to the right as viewed in FIG. 20. The weft threads 43, gripped in gripping jaws 16$c$, 16$d$, and suspended on holding fingers 17$c$ and 17$d$ are now in a condition in which they remain until they are used in the stitch knitting or warp knitting machine.

In the following phase of the operation, movement of conveyor 1 with fastening grippers 16 and holding fingers 17, and the movement of pulling supports 44 are continued in the same direction.

Conveyor 1 and pulling supports 44, 44′ continue the movement until the entire device arrives in the position T shown in FIGS. 3 and 21. In this position, fastening gripper 16$a$, which has been open in the meantime by operation of stop motion comb 23 whose teeth 24 act on the arms 22 of the movable jaws 19, are now aligned with tube 66, while the opened fastening grippers 16$b$ assume a position in which the axis thereof coincides with the marginal wall of the auxiliary gripper 68. During the following movement, guiding tube 66 and the auxiliary gripper 68 moves downwardly due to the above explained downward movement of the carrying support, and place the newly pulled out weft threads 43 in the open jaws of fastening grippers 16$a$ and 16$b$, as shown in FIG. 21.

In the next moment, fastening grippers 16$a$ and 16$b$ close and the operation of stop motion comb 23 acting on arms 22 of movable jaws 19 of grippers 16 is terminated.

At the same time, pulling support 44 arrives in a position in which its pulling fingers and guide roller 49 are located above the holding fingers 17a and 17b of conveyor chain 1″.

It will be understood that each of the elements described above, or two or more together, may also find a useful application in other types of apparatus for forming a movable weft yarn system differing from the types described above.

While the invention has been illustrated and described as embodied in a conveyor arrangement for forming loops of weft threads for insertion into a warp knitting machine, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adapatations should and are intended to be comprehended within the meaning and range of equivalence of the following claims.

What is claimed as new and desired to be protected by Letters Patent is set forth in the appended claims.

1. Apparatus for forming a system of weft threads, comprising, in combination, conveyor means movable in one direction through a supply station and a working station; a row of gripper means mounted on one side of said conveyor means, and a row of holding means mounted on the other side of said conveyor means for movement with the same; supply means located at said supply station on said one side of said conveyor means for supplying weft threads; loop forming means located at said supply station and being movable transverse to said one direction from said one side to said other side for forming of said weft threads loops extending across said conveyor means and being open on said one side and closed by a yoke portion on said other side; weft inserting means at said supply station located at said one side for inserting the ends of said open loops into said gripper means; and knock off means located at said supply station at said other side for transferring said yoke portions of said loops from said loop forming means to said holding means so that said conveyor means transports said open loops to said working station.

2. Apparatus as claimed in claim 1 wherein said weft inserting means include a row of auxiliary grippers, and guide means including a row of guiding tubes for guiding said supplied weft threads, and being operable for inserting said weft threads in said auxiliary grippers and into said gripper means; and wherein said loop forming means include transporting means movable in a direction transverse to said one direction across said conveyor means, at least one pulling support carried by said transporting means, and a row of pulling means mounted on said support for respectively engaging weft threads extending between a guiding tube and an auxiliary gripper on said one side, and for pulling the said weft thread during movement of said transporting means across said conveyor means to form said open loops.

3. Apparatus as claimed in claim 2 wherein said transporting means include an auxiliary endless conveyor having an upper run and a lower run and located above said conveyor means, said support being carried on one run, and including a second support carried on the other run and having other pulling means for forming loops when said second support is located on the lower run of said auxiliary conveyor means.

4. Apparatus as claimed in claim 2 wherein said conveyor means includes a pair of endless chains located at said sides, respectively; wherein said gripper means include pairs of fastening grippers for holding the ends of said open loops, said fastening grippers including stationary and movable jaws, and spring means biasing said movable jaws to close; means at said supply station for opening said movable jaws to grip said weft threads; stationary cam means at said working station for opening said movable jaws so that said ends are released; and cutting means at said working station for cutting off said yoke portions so that successive pairs of weft threads are delivered at said working station.

5. Apparatus as claimed in claim 2 wherein said weft inserting means include a reciprocable gripper support for said auxiliary grippers, and a tube support for said guiding tubes, means connecting said gripper support and tube support for mobement in timed relation, and cam means for operating said supports.

6. Apparatus as claimed in claim 5 wherein each auxiliary gripper includes a stationary jaw mounted on said gripper support, a movable jaw mounted on said stationary jaw, and a spring biassing said movable jaw to close; and wherein said weft inserting means include an operating member extending across said movable jaws and having portions engaging the same; and cam means for operating said operating member to open and close said auxiliary grippers in timed relation with the movement of said gripper support.

7. Apparatus as claimed in claim 6 wherein each auxiliary gripper has a cutting edge for cutting off said ends of each open loop when said ends are gripped by said gripper means.

8. Apparatus as claimed in claim 2 wherein said pulling means include a pair of pulling fingers spaced in said one direction; wherein said holding means include a pair of holding fingers spaced in said one direction a smaller distance than said pulling fingers; and wherein said knock off means include a row of pairs of knock off fingers operable between said pulling and holding fingers, and a kiock off support supporting said row of pairs of knock off fingers for turning movement therewith for transferring said yoke portions from said pulling fingers to said holding fingers; and including means for operating said knock off support.

9. Apparatus as claimed in claim 8 and including a guide roller mounted on said transportnig means between said pulling fingers for guiding the weft thread thereon.

10. Apparatus as claimed in claim 8 wherein said transporting means is an endless auxiliary conveyor carrying said pulling support and pulling fingers and moving the same in a direction perpendicular to said one direction; and including means for closing an auxiliary gripper for holding a weft thread so that said pulling fingers pull the same through one of said guiding tubes; and means for operating said guide means with said row of guiding tubes so that the weft thread passing through said one guiding tube and said auxiliary gripper is inserted into a pair of said gripper means after said open loop is formed by said pulling fingers.

References Cited

UNITED STATES PATENTS

| | | | |
|---|---|---|---|
| 1,680,614 | 8/1928 | Hill et al. | 66—84 |
| 1,804,106 | 5/1931 | Morton | 66—85 |
| 1,895,293 | 1/1933 | Morton | 66—85 |
| 1,924,649 | 8/1933 | Morton | 66—85 |
| 1,931,179 | 10/1933 | Coombes | 66—85 |
| 1,946,030 | 2/1934 | Morton | 66—85 |
| 2,000,643 | 5/1935 | Morton | 66—85 |
| 2,743,596 | 5/1956 | Noe | 66—84 |
| 3,364,701 | 1/1968 | Carman | 66—84 |
| 3,422,511 | 1/1969 | Seguin | 28—1 |

RONALD FELDBAUM, Primary Examiner

U.S. Cl. X.R.

66—85